(12) United States Patent
Fetvedt

(10) Patent No.: US 9,050,548 B2
(45) Date of Patent: Jun. 9, 2015

(54) MULTI-CHANNEL FILTER ASSEMBLY AND RELATED APPARATUS AND METHODS

(75) Inventor: Jeremy Fetvedt, Raleigh, NC (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 1156 days.

(21) Appl. No.: 12/975,570

(22) Filed: Dec. 22, 2010

(65) Prior Publication Data

US 2012/0159761 A1   Jun. 28, 2012

(51) Int. Cl.
  *B01D 35/00* (2006.01)
  *B01D 43/00* (2006.01)

(52) U.S. Cl.
  CPC ........... *B01D 43/00* (2013.01); *Y10T 29/49826* (2013.01)

(58) Field of Classification Search
  CPC ............... B01D 61/147; B01D 63/088; B01D 2201/30; B01D 2201/302
  USPC ................. 422/527, 534, 535, 547, 551, 552; 436/177, 178
  See application file for complete search history.

(56) References Cited

U.S. PATENT DOCUMENTS

| | | | |
|---|---|---|---|
| 1,634,566 A | 7/1927 | Wessman | |
| 2,527,471 A | 10/1950 | Von Losberg et al. | 226/14 |
| 2,721,016 A | 10/1955 | Canales | 226/2 |
| 4,279,860 A | 7/1981 | Smolen | 422/63 |
| 4,924,716 A | 5/1990 | Schneider | 73/866 |
| 4,987,721 A | 1/1991 | Turtschan | 53/167 |
| 5,011,662 A | 4/1991 | Noormohammadi et al. | 422/68.1 |
| 5,450,982 A | 9/1995 | Van Den Oever | 221/93 |
| 5,792,354 A * | 8/1998 | Aksberg | 210/406 |
| 5,939,024 A * | 8/1999 | Robertson | 422/534 |
| 6,060,024 A | 5/2000 | Hutchins et al. | 422/81 |
| 6,149,871 A * | 11/2000 | Guirguis et al. | 422/534 |
| 6,322,110 B1 | 11/2001 | Banker et al. | 285/334 |
| 6,490,782 B1 | 12/2002 | Duckett | 29/714 |
| 6,578,259 B2 | 6/2003 | Duckett | 29/801 |

FOREIGN PATENT DOCUMENTS

| | | |
|---|---|---|
| JP | 8131725 A | 11/2002 |
| WO | WO 92/12859 | 8/1992 |
| WO | WO 00/25922 | 5/2000 |

* cited by examiner

*Primary Examiner* — Jill Warden
*Assistant Examiner* — Dwayne K Handy

(57) ABSTRACT

A filter assembly includes a housing and filter elements. The housing includes internal chambers between first and second parallel outside surfaces, fluid inlet bores, and fluid outlet bores. Each internal chamber includes a filter element that partitions the internal chamber into an inlet chamber section and an outlet chamber section. The housing establishes a plurality of fluid flow channels from the inlet bores, through the inlet chamber sections, through the filter elements, through the outlet chamber sections and to the outlet bores, respectively. Each fluid channel includes a transverse fluid flow component in the inlet chamber section and the outlet chamber section. The filter assembly may be loaded into a filtering apparatus such that a plurality of separate fluid flow channels is established through the filter assembly. Fluid may be flowed through two or more of the fluid flow channels, wherein the fluid in each of the two or more fluid flow channels passes through the respective filter element and is filtered thereby.

20 Claims, 10 Drawing Sheets

MULTI-CHANNEL FILTER ASSEMBLY AND RELATED APPARATUS AND METHODS

TECHNICAL FIELD

The present invention relates generally to the filtering of media or fluids in connection with sample preparation, delivery and/or testing or analyzing process. More particularly, the invention relates to a filter assembly that provides multiple filtering elements and associated fluid flow channels, and apparatus and methods for in-line replacement of used filter elements with new filter elements.

BACKGROUND

Filter elements of various types are utilized to filter media or fluids flowing through the fluid lines of a fluid handling system. The fluid handling system may be provided for any number of processes involving one or more liquid-phase sample preparation, transfer and/or analytical tasks. A few examples include high-throughput liquid sample assaying, dissolution testing, and various types of chromatography, spectroscopy, and spectrometry. Filter elements are often installed in-line in such systems. For this purpose, each filter element may be individually housed in some type of filter unit equipped with fittings adapted for coupling to and decoupling from the fluid lines in which the fluid flows. An example of a filter unit is described in U.S. Pat. No. 6,490,782, which is incorporated by reference herein in its entirety. This type of filter unit has a polymeric housing that encloses a standard disk-shaped filter element and provides an inlet and outlet in the form of Luer-type male and female fittings. In any filter unit, the filter element has a limited useful life. That is, after a period of service, degradation, clogging and other conditions reduce the effectiveness of the filter element enough that the filter element must be replaced. The down-time and labor attending the replacement of filter elements have led to development of automated filter changing apparatus such as disclosed in the above-referenced U.S. Pat. No. 6,490,782.

The known filter changing apparatus of U.S. Pat. No. 6,490,782 is capable of coupling multiple Luer-type filter units to a corresponding number of individual fluid lines of a multi-channel fluid handling system, and changing out the multiple filter units with new filter units in a single filter-changing process. However, because the individual filter units have complex geometries and must be individually manipulated, moved and coupled to fluid lines by the filter changing apparatus, the mechanisms and components of the filter changing apparatus are relatively complex and the filter changing apparatus is relatively bulky and occupies significant bench-top space. Moreover, the filter units are typically provided in the form of vertical stacks in which the inlet of each filter unit is initially connected to the outlet of an adjacent filter unit. These stacks are loaded into the known filter changing apparatus, which is configured to disconnect the bottom-most filter unit from the stack and transport it to a fluid line for in-line coupling. The filter units are lengthy from inlet to outlet. Thus, a stack of just a few filter units has a significant height and, when loaded onto the known filter changing apparatus, occupies significant vertical space. To increase the amount of filter units available for replacement, the known filter changing apparatus provides a carousel on which multiple stacks of filter units may be loaded. The carousel, however, increases the footprint of the filter changing apparatus and adds to its complexity.

In view of the foregoing, there is a need for providing improved units for housing filter elements and apparatus and methods for replacing filter elements in the context of in-line filtering systems.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one implementation, a filter assembly includes a housing and a plurality of filter elements. The housing includes a first outside surface, a second outside surface parallel to the first outside surface and spaced therefrom along a first axis, a plurality of internal chambers between the first outside surface and the second outside surface, a plurality of fluid inlet bores, and a plurality of fluid outlet bores. Each internal chamber includes a first inside surface lying in a second axis perpendicular to the first axis, a second inside surface parallel to the first inside surface, and a filter support extending from the second inside surface along the first axis. Each internal chamber has a chamber height along the first axis and a chamber diameter along the second axis greater than the chamber height. The fluid inlet bores extend from the first outside surface to the respective first inside surfaces. The fluid outlet bores extend from the respective second inside surfaces to the second outside surface. The filter elements are disposed in the respective internal chambers in contact with the respective filter supports. Each filter element has a filter thickness along the first axis less than the chamber height. Each filter element partitions the respective internal chamber into an inlet chamber section between the first inside surface and the filter element and an outlet chamber section between the filter element and second inside surface. The housing establishes a plurality of fluid flow channels from the inlet bores, through the inlet chamber sections, through the filter elements, through the outlet chamber sections and to the outlet bores, respectively. Each fluid channel includes a transverse fluid flow component along the second axis in the inlet chamber section and in the outlet chamber section.

According to another implementation, a method is provided for method for filtering fluid. A filter assembly is loaded into a filtering apparatus. The filter assembly includes a plurality of internal chambers formed in a unitary housing and a plurality of filter elements disposed in the respective internal chambers. Loading the filter assembly places a plurality of fluid inlet bores of the filter assembly in communication with a plurality of respective fluid inlet couplings of the filtering apparatus, and a plurality of fluid outlet bores of the filter assembly in communication with a plurality of respective fluid outlet couplings of the filtering apparatus, such that a plurality of separate fluid flow channels are established through the filter assembly. Each fluid flow channel runs respectively from the fluid inlet coupling, through the fluid inlet bore, through the internal chamber including through the filter element disposed therein, through the fluid outlet bore, and to the fluid outlet coupling. Fluid is flowed through two or more of the fluid flow channels, wherein the fluid in each of the two or more fluid flow channels passes through the respective filter element and is filtered thereby.

According to another implementation, a filtering apparatus includes an inlet chute, a filter coupling assembly, and a drive plate. The inlet chute is configured for receiving a stack of plate-shaped filter assemblies. The filter assemblies may be of the type disclosed herein, in which each filter assembly includes a plurality of separate fluid flow channels and a plurality of respective filter elements. The filter coupling assembly includes a plurality of fluid inlet couplings and a plurality of fluid outlet couplings, and is movable between an uncoupled position and a coupled position. At the uncoupled position, the fluid inlet couplings and the fluid outlet couplings are spaced from each other and define a filter coupling region sized to receive a filter assembly. At the coupled position the fluid inlet couplings and the fluid outlet couplings are configured for fluid-tight communication with respective fluid flow channels of the filter assembly. The drive plate is movable between a filter loading position, a filter coupling position and a filter ejecting position. At the filter loading position the drive plate is configured for receiving a filter assembly from the inlet chute. At the filter coupling position, the drive plate is configured for positioning the fluid flow channels of the filter assembly in the fluid coupling region between the fluid inlet couplings and the fluid outlet couplings. At the filter ejecting position the drive plate is configured for ejecting the filter assembly from the drive plate.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

In the context of the present disclosure, the term "fluid" refers generally to liquid-phase materials. The terms "fluid" and "liquid" may be used interchangeably. A liquid-phase material or liquid may be any liquid, such as a solution, suspension, slurry, multi-phase mixture or the like, and may include gaseous components (e.g., bubbles) and/or solid components (e.g., particles or particulates).

In the context of the present disclosure, the term "analyte" refers generally to any sample molecule or compound of interest—that is, a molecule or compound on which an analysis is desired such as, for example, a chromatographic, spectroscopic, or spectrometric analysis.

Examples of implementations of the subject matter disclosed herein will now be described in more detail with reference to FIGS. 1-10.

Figure 1:
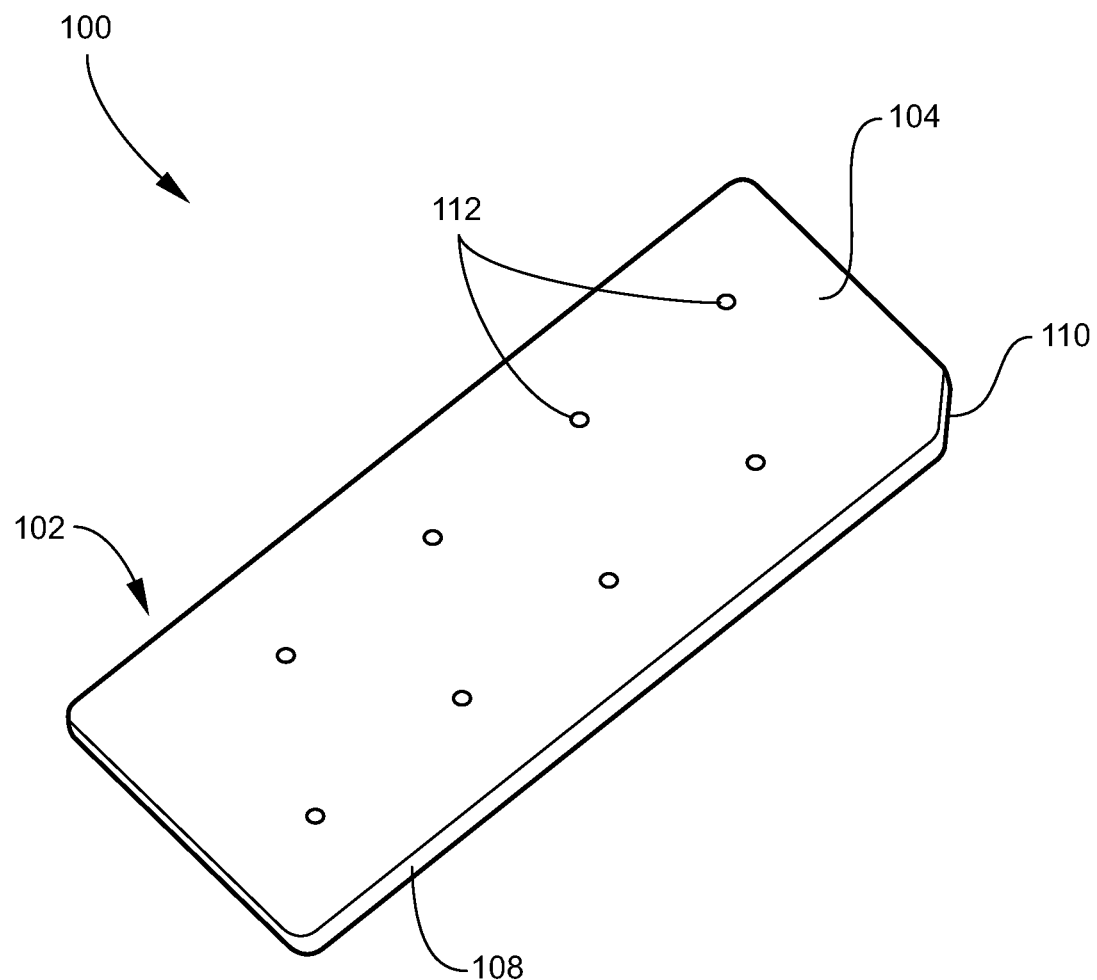
FIG. 1 is a perspective view of an example of a multi-channel filter assembly according to one implementation from an inlet side.
Figure 2:
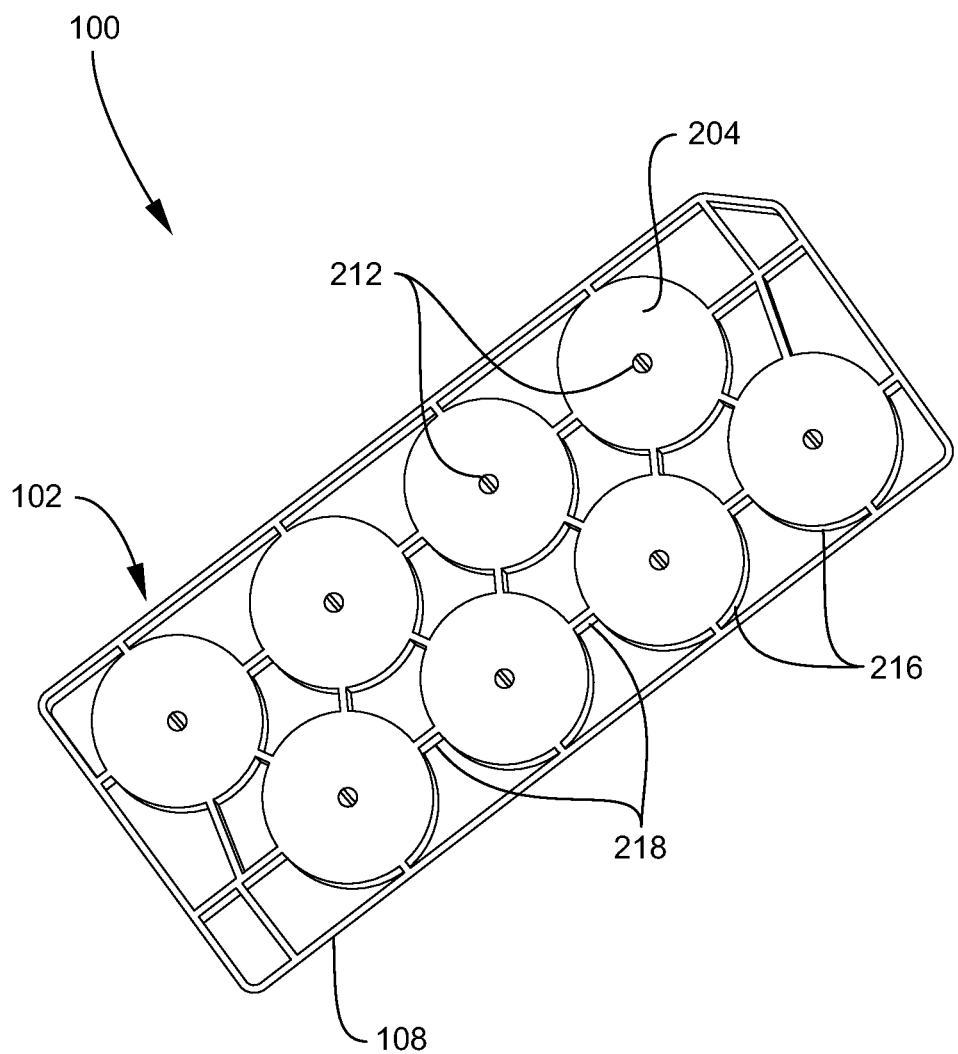
FIG. 2 is a perspective view the filter assembly illustrated in FIG. 1 from an outlet side.

FIGS. 1 and 2 are perspective views from opposing sides of an example of a multi-channel filter assembly (or filter plate) 100 according to one implementation. The filter assembly 100 generally includes a housing 102 that may be a unitary (i.e., single-piece) construction. The housing 102 may be fabricated or assembled by any suitable means and may be fabricated or assembled from two or more starting pieces. The fully fabricated or assembled housing 102, however, is unitary in the sense that the housing 102 and all of its components or contents are movable together as a single unit. Moreover, the housing 102 may be intended to be disposable and hence need not be disassembled. In typical implementations, the housing 102 has a polymeric composition. In one non-limiting example, the housing 102 may be composed of a cyclic olefin copolymer. The housing 102 generally includes a first outside surface 104, an opposing second outside surface 204, and a lateral surface 108 between the first outside surface 104 and the second outside surface 204 that defines the thickness or height of the housing 102, which may correspond to the overall thickness or height of the filter assembly 100. Several fluid inlet bores 112 are formed in the housing 102 from the first outside surface 104, and a corresponding number of fluid outlet bores 212 are formed in the housing 102 from the second outside surface 204. A corresponding number of internal chambers 302 (FIG. 3) are formed within the housing 102 between the first outside surface 104 and the second outside surface 204. Each fluid inlet bore 112 and corresponding fluid outlet bore 212 communicate with one of the internal chambers 302. In the present example, the filter assembly 100 respectively includes eight fluid inlet bores 112, fluid outlet bores 212 and internal chambers 302 and thus provides eight separate fluid flow channels running through the housing 102 from the inlet side (i.e., first outside surface 104) to the outlet side (i.e., second outside surface 204). In other implementations, the filter assembly 100 may provide more or less than eight fluid flow channels. A filter element 304 (FIG. 3) is disposed in each internal chamber 302 for filtering the fluid flowing through each fluid flow channel.

The first outside surface 104 and the second outside surface 204 are planar (e.g., flat) and parallel to each other. In the example illustrated in FIG. 2, the second outside surface 204 includes a number of distinct sections 216 surrounding respective fluid outlet bores 212 and internal chambers 302, with adjacent sections adjoined by ribs 218. These sections 216 are coplanar and collectively form the second outside surface 204. Alternatively, the second outside surface 204 may be contiguous like the first outside surface 104. The fluid inlet bores 112 and the fluid outlet bores 212 may be arranged in a two-dimensional array or pattern, i.e., in more than one row and column. As illustrated, one row may be offset from an adjacent row. This configuration enables the fluid inlet bores 112, fluid outlet bores 212, internal chambers 302 and their associated filter elements 304 to be arranged close together and hence minimizes the overall footprint of the multi-channel filter assembly 100.

Figure 3:
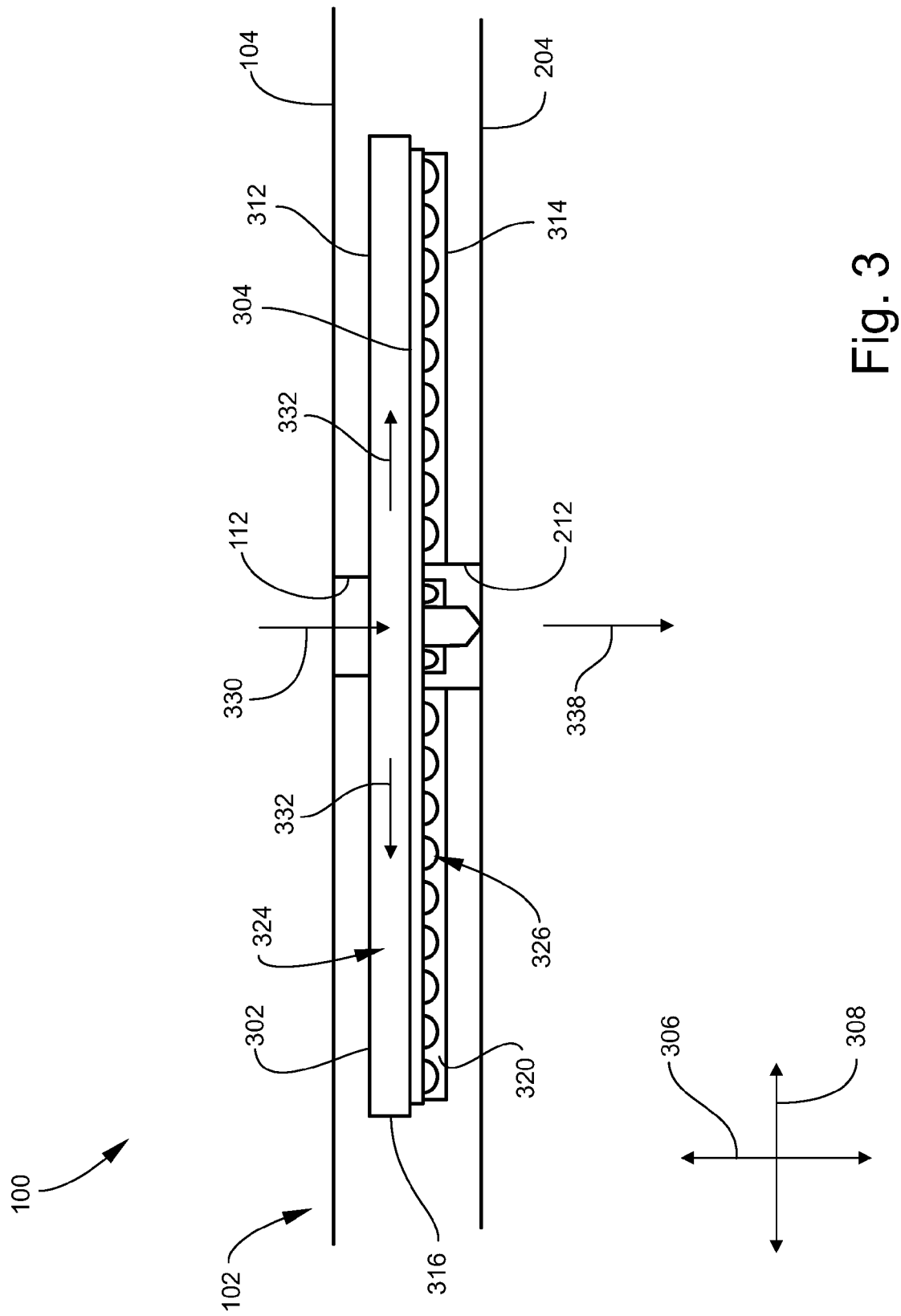
FIG. 3 is a cross-sectional view of a portion of the filter assembly illustrated in FIGS. 1 and 2 cut through one corresponding pair of fluid inlet and outlet bores.

FIG. 3 is a cross-sectional view of a portion of the filter assembly 100 cut through one corresponding pair of fluid inlet and outlet bores 112, 212, thus illustrating one of the several individual fluid flow channels provided by the filter assembly 100. For reference purposes, FIG. 3 designates a first axis or plane 306 (or thickness direction) and a second axis or plane 308 (or transverse direction) perpendicular to the first axis or plane 306. From the perspective of FIG. 3, and in a typical yet non-limiting orientation of the filter assembly 100, the first axis 306 is a vertical axis and the second axis 308 is a horizontal axis. An internal chamber 302 is formed in the housing 102 between each fluid inlet bore 112 and fluid outlet bore 212. In a typical implementation the fluid inlet bore 112, internal chamber 302 and fluid outlet bore 212 are axially aligned. In a typical implementation the internal chamber 302 is cylindrical, with a height along the first axis 306 and a diameter along the second axis 308. The chamber height may range from, for example, 1 to 10 mm and the chamber diameter may range from, for example, 5 to 30 mm. In a typical implementation, the chamber height is less than the chamber diameter. The internal chamber 302 is bounded and its height defined by a first inside surface 312 and a second inside surface 314 axially spaced from and facing the first inside surface 312. The internal chamber 302 is further bounded and its diameter defined by a lateral inside surface 316. The fluid inlet bore 112 extends from the first outside surface 104 to the first inside surface 312. The fluid outlet bore 212 extends from the second inside surface 314 to the second outside surface 204, and may be axially aligned with the fluid inlet bore 112.

A filter element (or filter membrane) 304 is disposed in each internal chamber 302. The filter element 304 is sized and located so as to be interposed in the fluid flow path through the filter assembly 100, i.e. between the fluid inlet bore 112 and the fluid outlet bore 212, whereby fluid flowing through the internal chamber 302 must pass through the thickness of the filter element 304 and be filtered thereby. In a typical implementation the filter element 304 is disk-shaped, having a thickness along the first axis 306 and a diameter along the second axis 308. To ensure that all fluid flowing through the internal chamber 302 is exposed to the filter element 304, the filter diameter may be substantially the same as (slightly larger than, equal to, or slightly less than) the chamber diameter. The filter thickness may be significantly less than the chamber height. As a non-limiting example, the filter diameter may range from 4 mm to 25 mm or otherwise be substantially coextensive with or span most of the chamber diameter, and the filter thickness is typically on the order of micrometers, e.g., 0.05 µm. By sizing the chamber height to be greater than the filter thickness, the internal chamber 302 provides space through which fluid flows along the second axis 308 as well as the first axis 306, thereby maximizing the amount of cross-sectional area of the filter element 304 to which the fluid is exposed. For this purpose, the filter element 304 may rest on or be mounted to a filter support 320 located in the internal chamber 302. The filter support 320 may have any configuration that results in the filter element 304 partitioning the internal chamber 302 into a chamber inlet section 324 between the first inside surface 312 and one (inlet) side of the filter element 304, and a chamber outlet section 326 between the second inside surface 314 and the opposite (outlet) side of the filter element 304. The filter support 320 may, for example, be structured as a ring coaxial to the fluid outlet bore 212 or, as in the illustrated example, include structural features that provide passages for fluid to flow through the chamber outlet section 326.

Thus, for each fluid flow channel established by the filter assembly 100, fluid flows through the fluid inlet bore 112 in a direction along the first axis (arrow 330) and into the chamber inlet section 324. The fluid flowing through the chamber inlet section 324 has both a flow component along the first axis (arrow 330) and a flow component along the second axis (arrows 332). In this manner, the fluid flowing through the chamber inlet section 324 is distributed radially outward (relative to the first axis 306) so as to contact all or most of the inlet side of the filter element 304. The fluid then passes through the thickness of the filter element 304 and the resulting filtered fluid enters the chamber outlet section 326. Like the chamber inlet section 324, the fluid flowing through the chamber outlet section 326 has flow components (not shown) along both the first axis 306 and the second axis 308. In this manner, all fluid passing through the filter element 304 is directed to the fluid outlet bore 212 without backflow through the filter element 304, and continuous flow through the fluid flow channel is maintained and development of backpressure is minimized or avoided. The filter support 320 may be configured with passages to promote the routing of filtered fluid emanating from all regions of the filter element 304 toward the fluid outlet bore 212. The fluid then flows through the fluid outlet bore 212 along the first axis 306 (arrow 338).

In other implementations, the filter assembly 100 may also include structural features (not shown) in the chamber inlet section 324 that facilitate distributing fluid radially outwardly across the filter element 304 to maximize the amount of filter material contacted by the fluid.

The composition and porosity of the filter elements 304 will depend on the type of fluid to be filtered. As non-limiting examples, the filter elements 304 may be composed of poly (tetrafluoroethene) (PTFE, e.g. TEFLON®), glass fibers, polyvinylidene fluoride (PVDF), etc. In typical yet non-limiting implementations, the porosity of the filter elements 304 ranges from 0.1 µm to 100 µm, with typical examples being 0.22 µm and 0.45 µm.

Figure 4:
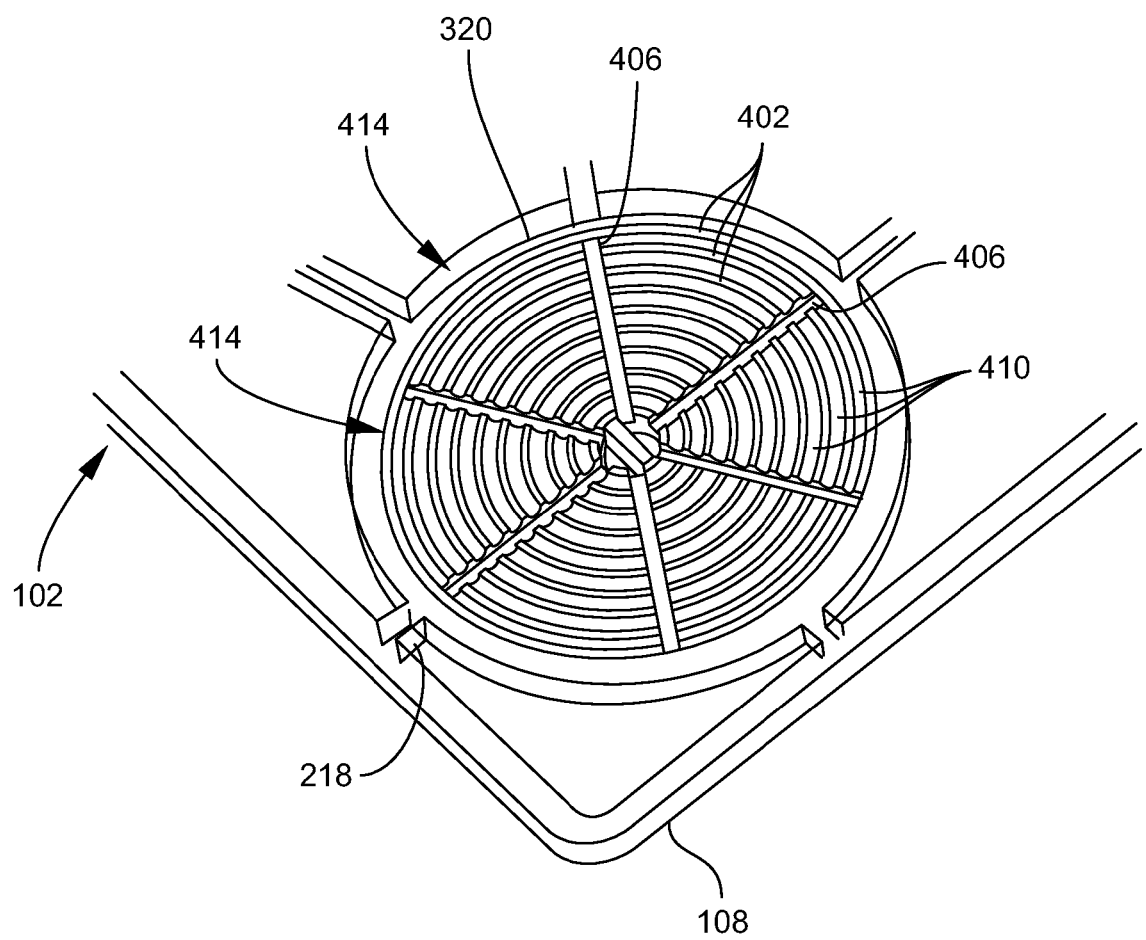
FIG. 4 is a cross-sectional perspective view of a portion of the filter assembly, taken in a transverse plane through an internal chamber to show an example of a filter support.

FIG. 4 is a cross-sectional perspective view of a portion of the filter assembly 100, taken in a transverse plane (perpendicular to the first axis 306) through one of the internal chambers 302 to show the filter support 320 from a top perspective. As shown in this example, the filter support 320 may include structural features such as support walls 402. The support walls 402 may be spaced from each other so as to define passages for fluid to flow from the filter element 304, through the chamber outlet section 326 and to the fluid outlet bore 212. The support walls 402 or other structural features may be configured to provide any appropriate pattern of passages effective for receiving the fluid filtered by the filter element 304 and routing the filtered fluid to the fluid outlet bore 212. As shown in this example the passages may include radial passages 406 (oriented radially relative to the first axis 306) and/or non-radial passages 410 (oriented non-radially relative to the first axis 306). Some or all of the radial passages 406 and/or non-radial passages 410 may communicate directly with the fluid outlet bore 212, while other radial passages 406 and/or non-radial passages 410 may communicate indirectly with the fluid outlet bore 212 via their direct communication with other passages. In the example specifically illustrated in FIG. 4, the non-radial passages 410 are curved passages coaxial to the fluid outlet bore 212. More specifically, the non-radial passages 410 form a concentric pattern of circular passages communicating directly with radial passages 406 that in turn communicate directly with the fluid outlet bore 212. This pattern may be realized, for example, by partitioning the filter support 320 into support sections 414 shaped as circular sectors and containing the circular passages, with each support section 414 spaced from adjacent support sections 414 by gaps that define the radial passages 406.

It will be understood that the filter support 320 may be configured to provide a variety of other patterns of passages. Another example of non-radial passages are straight passages spaced from each other at radial intervals outward from the fluid outlet bore 212. Such straight passages may be tangential, i.e., follow lines tangential to circles coaxial with the fluid outlet bore 212, or may be angled relative to such tangential lines. Straight passages may be arranged in a pattern similar to the curved passages shown in FIG. 4 and communicate with radial passages 406 defined between support sections 414 of the filter support 320. Another example of non-radial passages are one or more spiral passages that communicate with the fluid outlet bore 212.

The filter assembly 100 may generally be characterized as having a plate-shaped or planar configuration. For instance, in the illustrated example the length and width of the first outside surface 104 are each significantly greater than the thickness of the housing 102. The plate-shaped or planar configuration of the filter assembly 100 facilitates stacking together several filter assemblies 100 in series in an outside surface-wise manner, i.e., with the first outside surface 104 of one filter assembly 100 being adjacent to the second outside surface 204 of an adjacent filter assembly 100. By this configuration, several filter assemblies 100 may be stored and transported together as a low-profile stack. The stack of filter assemblies 100 may be easily loaded into a magazine, container or other holding device, which may be provided with or mounted to a filtering apparatus such as described below. Each filter assembly 100 may also take up a relatively small footprint. For example, the area of the first outside surface 104 may range from 9000 to 12000 mm². The relatively small footprint combined with the low height profile of each filter assembly 100 enable a stack of filter assemblies 100 to provide a large number of filter elements 304 available for use in a fluid filtering system without taking up a large amount of space. As an example, the thickness or height of each filter assembly 100 (e.g., the thickness of height of the housing 102) may range from 4 mm to 20 mm, and in another example from 4 mm to 6 mm. Thus, considering the latter case of 4-6 mm, a stack of, for example, ten filter assemblies 100, each containing eight filter elements 304, would take up an overall height ranging from 40 mm to 60 mm and occupy the footprint of a single filter assembly 100, yet provide of total of eighty filter elements 304 available for use.

To facilitate stacking filter assemblies 100 in a uniform manner, each filter assembly 100 may include a structural feature that renders the filter assembly 100 non-symmetrical such as, for example, a notch at one edge of the housing 102 or, as shown in FIGS. 1 and 2, a chamfered edge 110. Alternatively, each filter assembly 100 may include a printed feature such as dot or line at a location that is the same for all filter assemblies 100.

Figure 5:
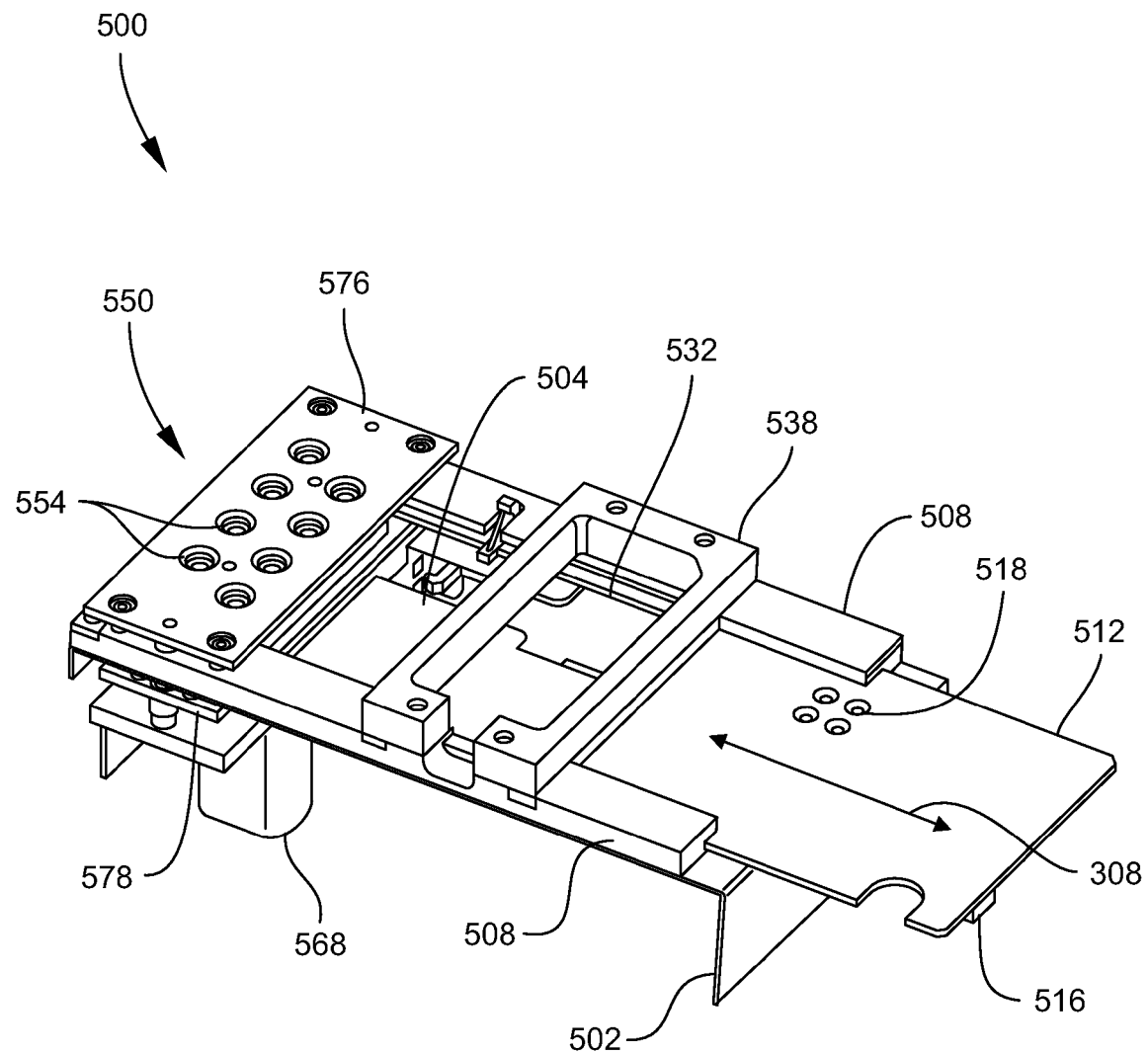
FIG. 5 is a perspective view of an example of a filtering apparatus that may be utilized in conjunction with the filter assemblies disclosed herein, wherein the filtering apparatus is in a filter loading position.
Figure 6:
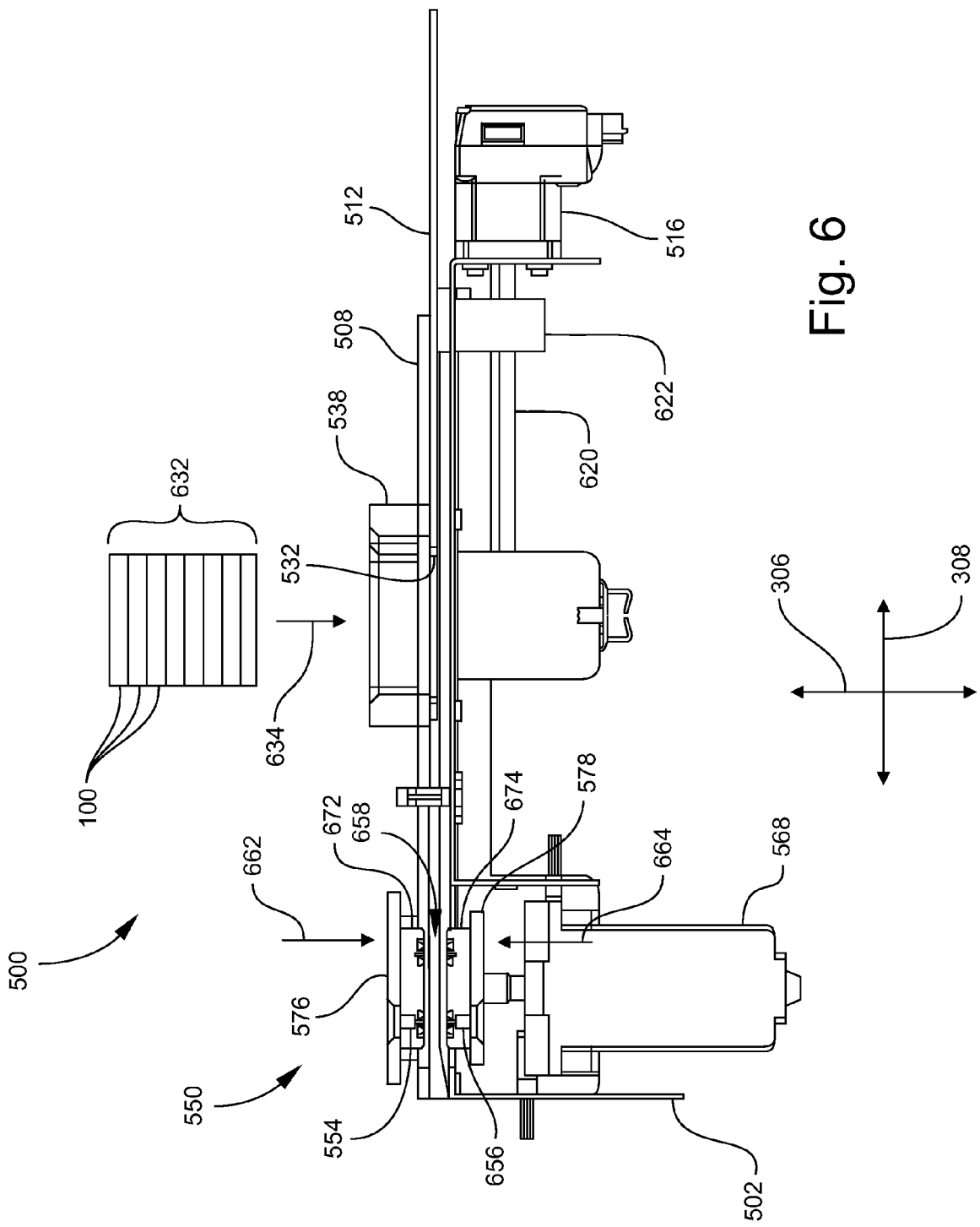
FIG. 6 is a cross-sectional view of the filtering apparatus illustrated in FIG. 5, taken along the transverse axis indicated in FIG. 5.

FIG. 5 is a perspective view of an example of a filtering apparatus 500 that may be utilized in conjunction with the filter assemblies 100 disclosed herein. FIG. 6 is a cross-sectional view of the filtering apparatus 500 taken along the second (transverse) axis 308 indicated in FIG. 5. The filtering apparatus 500 may be configured for coupling the fluid flow channels of a filter assembly 100 in-line with the fluid lines (tubing, conduits, etc.) associated with any system entailing the transport and filtering of fluids. An example of such a system is a fluid sampling system in which the fluid is a dissolution medium that must be prepared, filtered and transported to a sample destination (e.g., a fraction collector or other type of sample collector, a sample injector of a chromatography instrument, sample cells or flow cells utilized for optical spectroscopy, etc.) in preparation for analysis of analytes dissolved in the dissolution medium. The filtering apparatus 500 may also be configured for changing a used filter assembly 100 with a new filter assembly 100, i.e., decoupling the used filter assembly 100 from the fluid lines, replacing the used filter assembly 100 with a new filter assembly 100, and coupling the new filter assembly 100 with the fluid lines. Accordingly, the filtering apparatus 500 may also be referred to as a filter coupling apparatus or a filter changing apparatus. The filtering apparatus 500 may be configured for performing filter coupling/decoupling and filter changing in an automated manner.

In the illustrated example, the filtering apparatus 500 includes a frame 502 of any configuration suitable for supporting various components of the filtering apparatus 500. The frame 502 may include or support a base 504. A pair of parallel support blocks (or drive plate guides) 508 elongated along the second axis 308 is mounted to the base 504. The support blocks 508 include respective tracks facing each other in which a drive plate 512 is supported. The drive plate 512 is movable in the tracks along the second axis 308 in both a forward and reverse direction over the base 504. The drive plate 512 may be driven to move (translate) along the tracks by a motor 516 (e.g., a reversible stepper motor) via any suitable linkage connected to the drive plate 512 by any suitable mounting feature 518 (e.g., bolts). In the present example, the linkage includes a lead screw 620 driven to rotate about the second axis 308 by the motor 516, and a carriage 622 connected to the drive plate 512 and driven along the second axis 308 by the lead screw 620. The drive plate 512 is configured to receive and carry a single filter assembly 100. For this purpose, the drive plate 512 may include a filter assembly holder of any suitable configuration. In the illustrated example the filter assembly holder is provided as a drive plate opening 532 formed in the drive plate 512. The drive plate opening 532 may have an area large enough to accommodate the footprint (planar area) of the filter assembly 100 and a height is similar to the height of the filter assembly 100.

The filtering apparatus 500 may be configured to receive a stack 632 of filter assemblies 100. To minimize the footprint of the filtering apparatus 500, the filter assemblies 100 may be stacked together in a vertical orientation and the vertical stack 632 loaded or mounted onto the filtering apparatus 500 in a vertical direction as indicated by an arrow 634 in FIG. 6. To facilitate receipt of the filter stack 632 in proper alignment with the drive plate opening 532, the filtering apparatus 500 may include an intake chute 538 mounted on the support blocks 508 that has an opening large enough to accommodate the footprint of the filter assembly 100. The intake chute 538 may be deep enough to support the entire stack 632 of filter assemblies, or may be configured to receive or couple to a magazine (not shown) that retains the filter assemblies 100 together as a stack 632.

The filtering apparatus 500 further includes a filter coupling assembly 550 mounted to the frame 502 at one end. The filter coupling assembly 550 includes a plurality of fluid inlet couplings 554 and a plurality of fluid outlet couplings 656 configured for respective connection to a corresponding number of fluid inlet lines and fluid outlet lines (e.g., tubes, conduits, etc., not shown). Only one pair of corresponding fluid inlet and outlet couplings 554, 656 is shown in the cross-sectional view of FIG. 6. A fluid coupling region 658 is axially interposed between the fluid inlet couplings 554 and the fluid outlet couplings 656. While in the present example the fluid inlet couplings 554 are located above the fluid coupling region 658 and the fluid outlet couplings 656 are located below the fluid coupling region 658, in other implementations these respective positions may be reversed. The fluid coupling region 658 lies generally in the same plane as the drive plate 512. By this configuration, the filtering apparatus 500 may actuate the drive plate 512 to load a filter assembly 100 into the fluid coupling region 658, and actuate the filter coupling assembly 550 to place the fluid inlet couplings 554 and fluid outlet couplings 656 into communication with the fluid inlet bores 112 and fluid outlet bores 212 (FIGS. 1-3) of the filter assembly 100, respectively. In the present implementation, the fluid connections to the filter assembly 100 are effected by what may be characterized as a clamping action, e.g. by moving the fluid inlet couplings 554 toward the filter assembly 100 in one direction (arrow 662) along the first axis 306 and moving the fluid outlet couplings 656 toward the filter assembly 100 in the opposite direction (arrow 664) along the first axis 306. The fluid inlet couplings 554 and fluid outlet couplings 656 may be driven to move by a motor 568 (e.g., a reversible stepper motor) via any suitable linkage configured to convert rotation of a shaft of the motor 568 to linear translation of the fluid inlet couplings 554 and fluid outlet couplings 656 in the respective axial directions 662, 664.

In the present example, the fluid inlet couplings 554 are mounted in or formed as part of a fluid inlet block 672 and the fluid outlet couplings 656 are mounted in or formed as part of a fluid outlet block 674. The fluid inlet block 672 and the fluid outlet block 674 communicate with or form a part of the linkage connected to the motor 568, either directly or indirectly through other structures such as plates 576, 578. The plates 576, 578 have apertures through which fluid inlet lines and fluid outlet lines may be connected to the fluid inlet couplings 554 and fluid outlet couplings 656, respectively. In one implementation, the motor 568 drives a lead screw (not shown) about the first axis 306, and the plates 576, 578 are coupled to the lead screw such that rotation of the lead screw in one direction causes the plates 576, 578 to move in opposing directions 662, 664 toward the filter assembly 100 during coupling, while rotation of the lead screw in the reverse direction causes the plates 576, 578 to move in opposing directions away from filter assembly 100 during decoupling.

Figure 8:
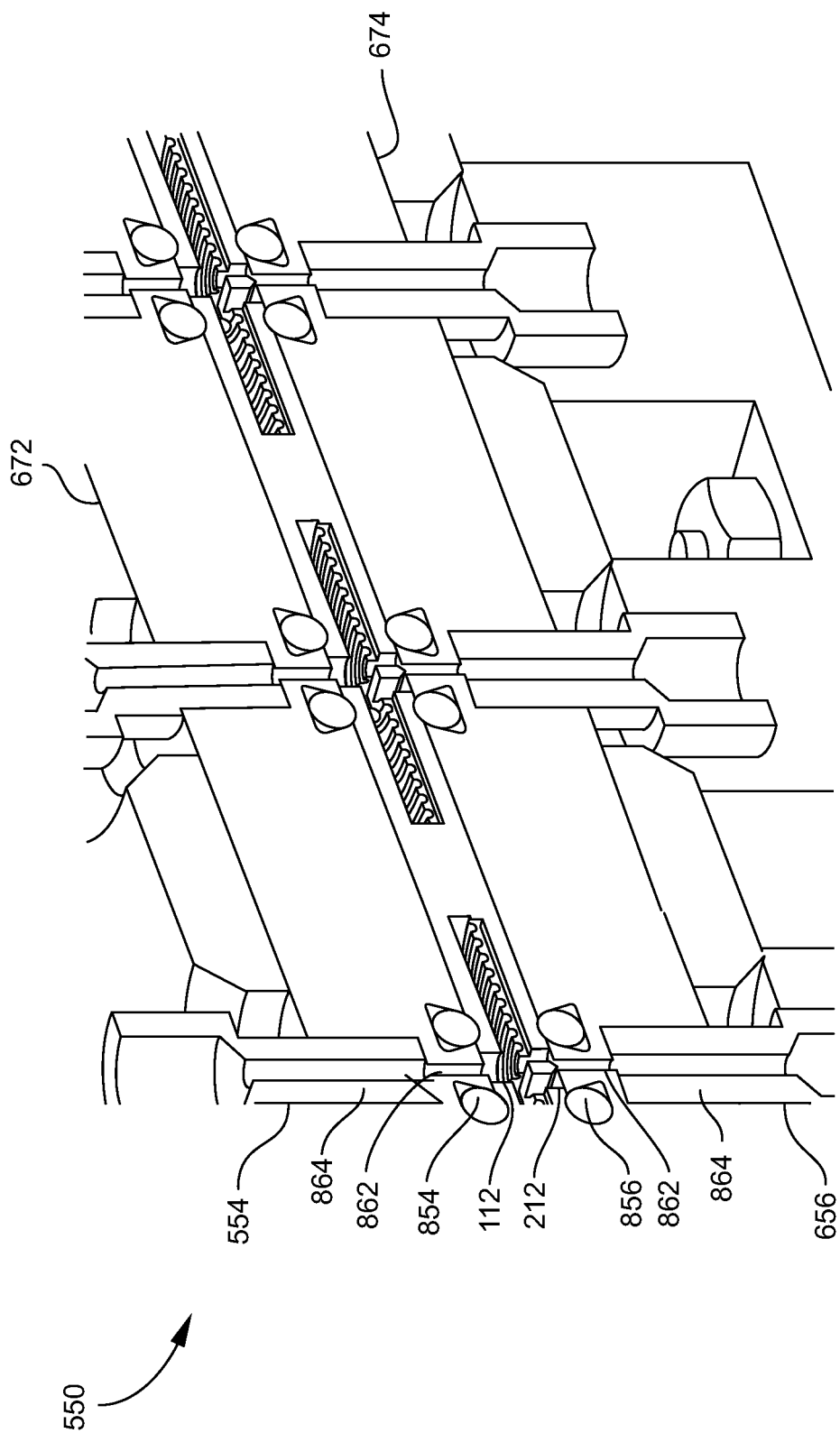
FIG. 8 is a perspective cross-sectional view of the filter coupling assembly in an in-line coupled position.

The filter coupling assembly 550 is thus movable between the uncoupled (or unclamped, or unconnected) position shown in FIG. 6 and a coupled (or clamped, or connected) position (FIG. 8). In the uncoupled position, the filter coupling assembly 550 is ready to receive a filter assembly 100 in the filter coupling region 658 defined between the fluid inlet couplings 554 and fluid outlet couplings 656. In the uncoupled position, no fluid connections exist between the fluid inlet couplings 554 and fluid inlet bores 112, (FIGS. 1 and 3) or between the fluid outlet couplings 656 and fluid outlet bores 212 (FIGS. 2 and 3), regardless of whether a filter assembly 100 has been loaded into the filter coupling region 658. In the coupled position, the fluid inlet couplings 554 and fluid outlet couplings 656 have been brought into fluid-tight registry with the fluid inlet bores 112 and fluid outlet bores 212, respectively.

In the present implementation, the filtering apparatus 500 (and particularly the drive plate 512) is movable between a filter loading position, a filter coupling position, and a filter ejecting position. FIGS. 5 and 6 illustrate the filter loading position. In the filter loading position, the drive plate opening 532 is aligned with the intake chute 538. Hence, when the filter stack 632 is loaded in the intake chute 538, the bottom-most filter assembly 100 is able to drop down into the drive plate opening 532.

Figure 7:
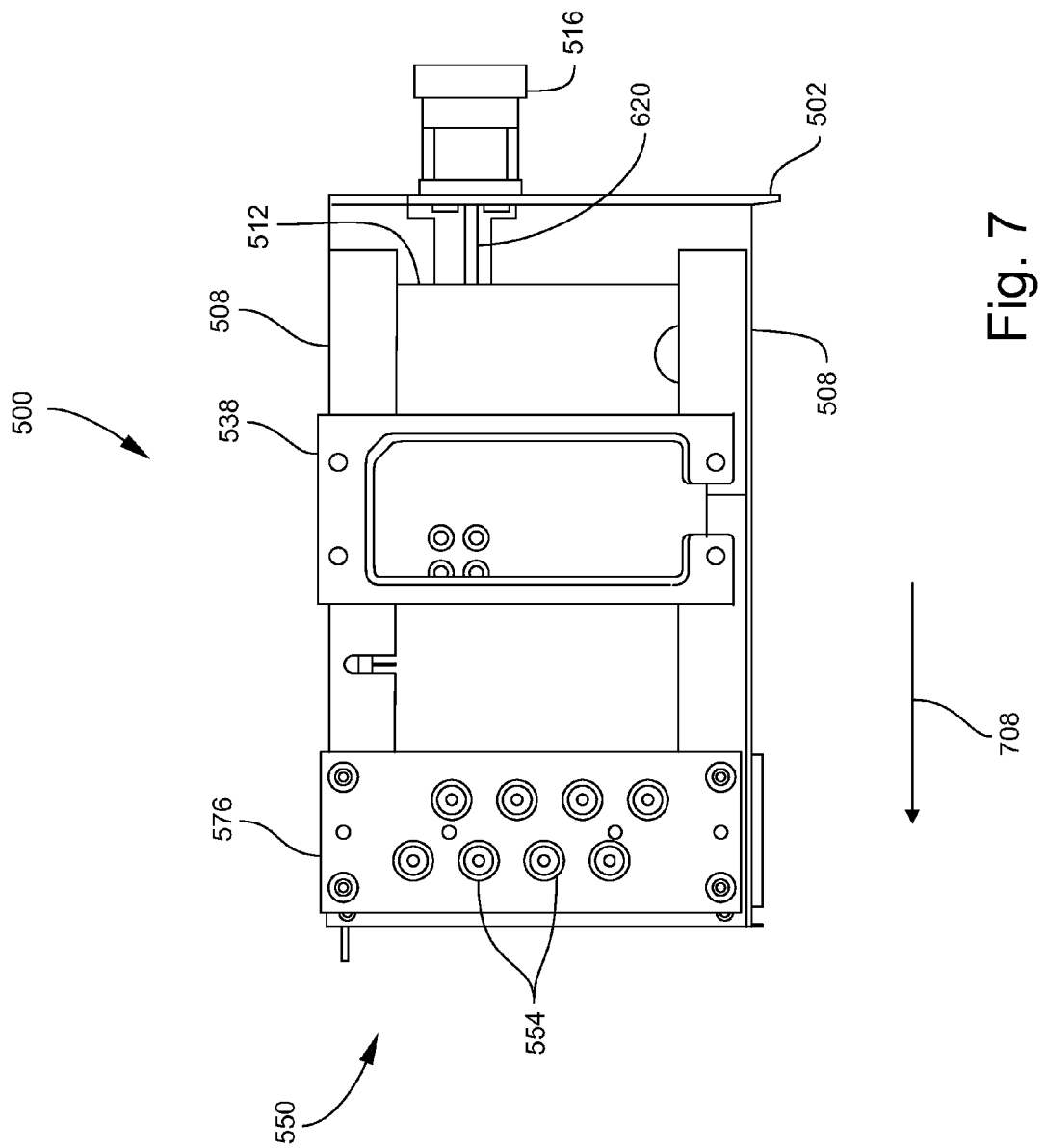
FIG. 7 is a perspective view of the filtering apparatus in a filter coupling position.

FIG. 7 is a perspective view of the filtering apparatus 500 in the filter coupling position. In moving from the filter loading position to the filter coupling position, the drive plate 512 is translated along the second axis 308 in a direction (arrow 708) toward the filter coupling assembly 550 while carrying a filter assembly 100 in the drive plate opening 532. The drive plate 512 is translated until the filter assembly 100 reaches the filter coupling position, where the fluid inlet bores 112 and fluid outlet bores 212 of the filter assembly 100 are axially aligned with the fluid inlet couplings 554 and fluid outlet couplings 656 of the filtering apparatus 500, respectively. At this time, the filter coupling assembly 550 is actuated to move from the uncoupled position to the coupled position.

While the filtering apparatus 500 is in the filter coupling position (FIG. 7), the filter stack 632 in the intake chute 538 may rest on the drive plate 512. When the drive plate 512 is moved back to the filter loading position (FIGS. 5 and 6), the bottom-most filter assembly 100 of the filter stack 632 may drop into the drive plate opening 532 which is now aligned with the intake chute 538. The movement of the bottom-most filter assembly 100 into the drive plate opening 532 may be effected by gravity, or alternatively may be assisted by spring-biasing or other mechanical means provided by the filtering apparatus 500. Alternatively, the intake chute 538, other component of the filtering apparatus 500, or a magazine (not shown) supporting the filter stack 632 may be configured to retain the bottom-most filter assembly 100 of the filter stack 632 above the drive plate 512 while the drive plate 512 is moving or in the filter coupling position, and then release the bottom-most filter assembly 100 when the drive plate 512 is in the filter loading position.

FIG. 8 is a perspective cross-sectional view of the filter coupling assembly 550 in the coupled position. The fluid inlet block 672 and fluid outlet block 674 have been moved into contact with the first outside surface 104 and second outside surface 204 (FIGS. 1-3) of the filter assembly 100, respectively, or with at least portions of the first outside surface 104 and second outside surface 204 surrounding the fluid inlet bores 112 and fluid outlet bores 212, by any manner suitable for making fluid-tight connections between the fluid inlet couplings 554 and fluid outlet couplings 656 and the respective fluid inlet bores 112 and fluid outlet bores 212. In the illustrated example, the filter inlet block 672 and filter outlet block 674 include deformable sealing rings 854, 856 coaxial to the respective fluid inlet couplings 554 and fluid outlet couplings 656 that come into contact with the first outside surface 104 and second outside surface 204 to ensure fluid-tight connections. The first outside surface 104 and second outside surface 204 may or may not include annular grooves configured for receiving a portion of the sealing rings 854, 856. As shown in FIG. 8, each fluid inlet coupling 554 or fluid outlet coupling 656 may include a bore 862 formed in the fluid inlet block 672 or fluid outlet block 674, a fluid fitting or connector 864 inserted in the filter inlet block 672 or filter outlet block 674, or a combination of both.

Figure 9:
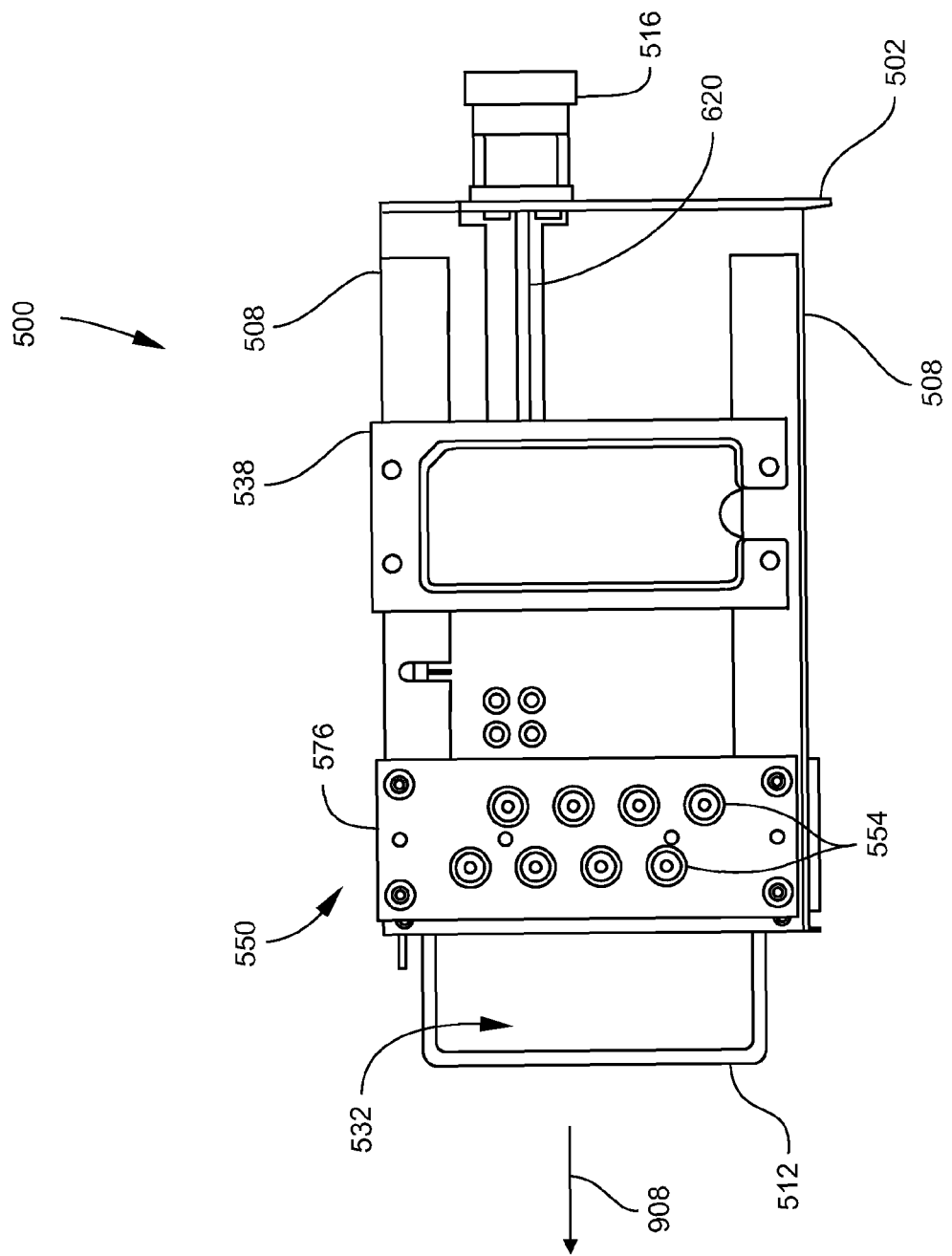
FIG. 9 is a perspective view of the filter coupling assembly in a filter ejecting position.

While in the filter coupling position, the filter assembly 100 is operative for flowing fluids through the separate fluid flow channels of the filter assembly 100 such that the fluid in each fluid flow channel is filtered by a corresponding filter element 304 (FIG. 3) of the filter assembly 100. Depending on the particular procedure being implemented, fluid may be flowed any one or more selected fluid flow channels, and may be flowed either simultaneously or sequentially through two or more of the fluid flow channels. After a number of uses (filtering cycles), new filter elements 304 may be desired or necessary for effectively filtering fluid. As noted above, the filtering apparatus 500 is configured for changing out a used filter assembly 100 with a new filter assembly 100 in an automated manner. FIG. 9 is a perspective view of the filtering apparatus 500 in the filter ejecting position. To replace a used filter assembly 100 with a new filter assembly 100, the filter coupling assembly 550 is actuated to decouple the filter inlet couplings 554 and filter outlet couplings 656 from the respective fluid inlet bores 112 and fluid outlet bores 212 which, in the present example, is done by moving the fluid inlet block 672 and fluid outlet block 674 (FIGS. 6 and 8) away from the respective first outside surface 104 and second outside surface 204 of the used filter assembly 100. The filtering apparatus 500 is then moved from the filter coupling position to the filter ejecting position. More specifically, the drive plate 512 is translated along the second axis 308 in a direction (arrow 908) away from the filter coupling assembly 550 and the intake chute 538, thereby moving the used filter assembly 100 (still carried in the drive plate opening 532) out from the filter coupling region 658. The drive plate 512 is translated in this direction 908 until the used filter assembly 100 is ejected from the drive plate opening 532. In the present example, the drive plate 512 is moved until the drive plate opening 532 is in open communication with a filter receptacle (not shown) located outside the filter coupling region 658, thereby enabling the used filter assembly 100 to drop down into the filter receptacle. Subsequently, the drive plate 512 may be retracted back to the filter loading position (FIGS. 5 and 6) to receive a new filter assembly 100 from the filter stack 632, and then moved to the filter coupling position (FIG. 7) whereby the new filter assembly 100 is ready to be coupled in-line (FIG. 8) for operation.

Figure 10:
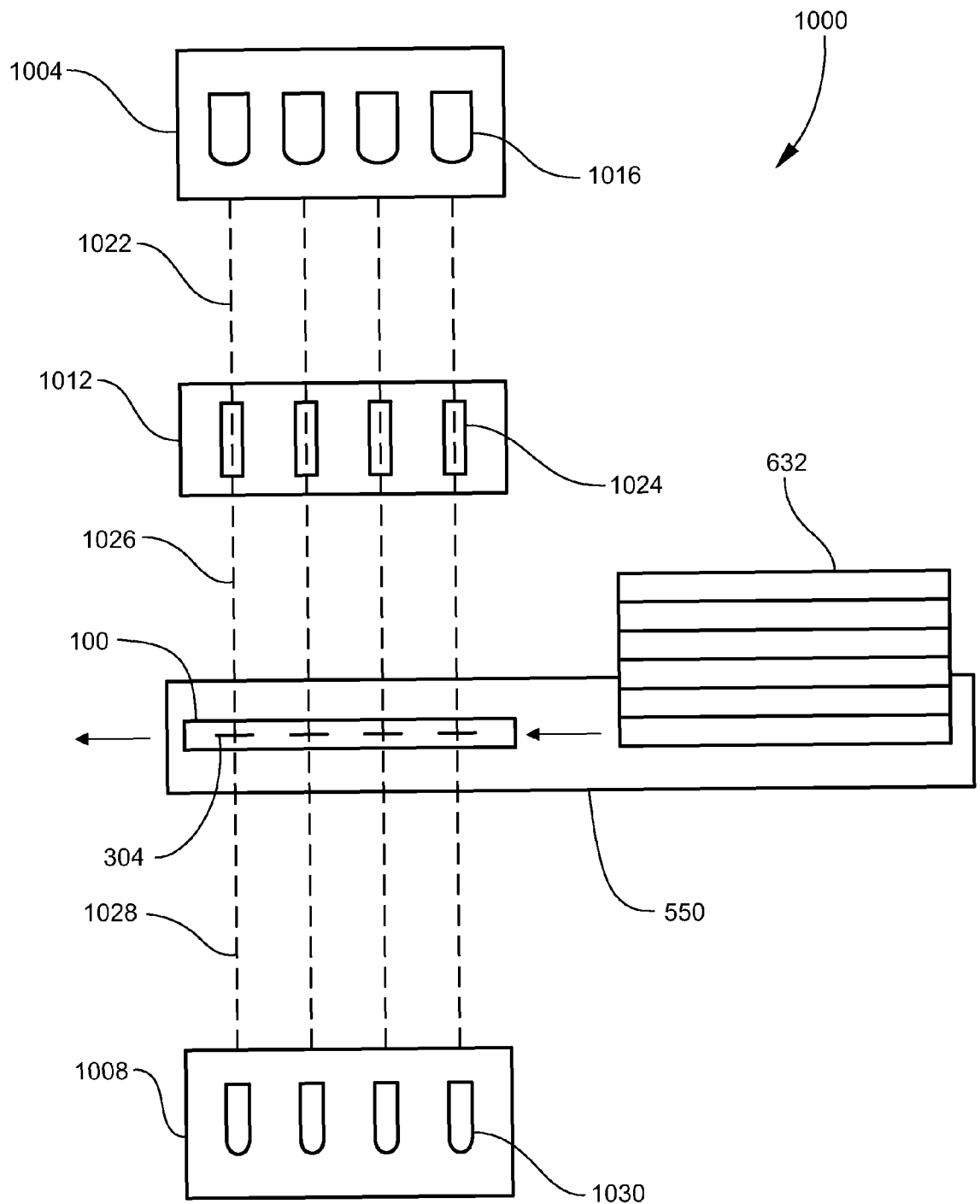
FIG. 10 is a schematic view of an example of an operating environment or system in which filter assemblies and associated filtering apparatus may operate.

FIG. 10 is a schematic view of an example of an operating environment or system in which filter assemblies 100 and associated filtering apparatus 500 may operate. The operating environment may, for example, be a multi-channel fluid sampling system 1000. The fluid sampling system 1000 may generally include a fluid sample source 1004 for providing or preparing samples, a sample collecting apparatus 1008 for receiving filtered samples, and a fluid moving device 1012 for moving fluid over multiple fluidic channels from the fluid sample source 1004, through the respective filter elements 304 (FIG. 5) of the filter assembly 100 operating at the filtering apparatus 500, and to the sample collecting apparatus 1008. FIG. 10 illustrates four fluidic channels by example— as noted above, no limitation is placed on the number of different channels. In the present example, the fluid sampling system 1000 is a dissolution media sampling system in which the fluid sample source 1004 is a dissolution test apparatus, the sample collecting apparatus 1008 is any device or sample destination configured for receiving samples in preparation for analysis (e.g., a fraction collector or other type of sample collector, a sample injector of a chromatography instrument, sample cells or flow cells utilized for optical spectroscopy, etc.), and the fluid moving device 1012 is any multi-channel pump appropriate for operation with a dissolution media sampling system that includes the filtering apparatus 500 (e.g., syringe pump, peristaltic pump, etc.).

As appreciated by persons skilled in the art, the dissolution test apparatus is typically configured to dissolve dosage forms (e.g., tablets, capsules, transdermal patches, vascular stents, contact lenses, implantable medical devices or prostheses, etc.) in dissolution media contained in dissolution test vessels 1016. The dissolution test apparatus thus prepares respective volumes of fluid contained in its vessels 1016 from which sample aliquots may be drawn for filtering, collection and analysis. The fluid (or liquid sample matrix) to be filtered thus typically includes a dissolution medium (e.g., solvent(s), pH buffer(s), etc.), analytes dissolved in the dissolution medium from the dosage forms (e.g., a therapeutically active agent or other chemistry of interest), and particulates carried in the dissolution medium (e.g., excipients, fillers and/or other non-analytical components originated from the dosage forms). The filter elements 304 of the filter assembly 100 may be configured to block the passage of the particulates as they typically are not of analytical value and may impair the analysis performed by the analytical instrument receiving the fluid samples.

In the present example, the fluid moving device 1012 is located in-line between the fluid sample source 1004 and the filtering apparatus 500 (and its active filter assembly 100). Multiple fluid inlet lines (e.g., the type of tubing typically utilized in dissolution testing or liquid chromatography) are provided for transferring fluid over multiple fluidic channels from the fluid sample source 1004 to the filtering apparatus 500. In the present example, the fluid inlet lines include fluid lines 1022 running from individual dissolution test vessels 1016 to corresponding pumping units 1024 (e.g., syringe barrels), and fluid lines 1026 running from the pumping units 1024 to the corresponding fluid inlet couplings 554 of the filtering apparatus 500. A like number of fluid outlet lines 1028 run from the fluid outlet couplings 656 of the filtering apparatus 500 to corresponding receptacles 1030 of the sample collecting apparatus 1008 which may, for example, be sample containers; inlet port(s) to one or more valves, septum-piercing needles, cannulas, sample loops, etc.; sample injection ports to an analytical device; sample cells of an analytical device, etc.

As appreciated by persons skilled in the art, the filtering apparatus 500 may include a controller (not shown) or communicate with a controller provided elsewhere by the fluid sampling system 1000. Typically, the controller is an electronic processor-based controller which may be, or be included with, or cooperate with electronic hardware, firmware, software, an application specific integrated circuit (ASIC), a computer, etc. As examples, the controller may control the motors 516, 568 or other drive means or actuating devices of the filtering apparatus 500. The controller may synchronize the respective operations of the drive plate 512 and the filter coupling assembly 550. For this purpose, the controller may communicate with devices configured for sensing the various positions of some or all of the movable components of the filtering apparatus 500. Such devices may include, for example, limit switches, optical sensors, magnetic sensors, etc. mounted at various locations on the filtering apparatus 500. The controller may synchronize the respective operations of the filtering apparatus 500 and other components of a system with which the filtering apparatus 500 cooperates such as, for example, the fluid moving device 1012, one or more components of a dissolution test apparatus 1004, one or more components of a sample collecting apparatus 1008, one or more components of a chromatographic, spectroscopic or other analytical instrument, etc. The controller and other components associated with the control of components, devices, or systems are not central to the subject matter disclosed herein and/or are readily configurable and applicable by persons skilled in the art, and therefore need not be described in detail herein.

In general, terms such as "communicate" and "in communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A filter assembly, comprising:
    a housing comprising:
        a first outside surface;
        a second outside surface parallel to the first outside surface and spaced therefrom along a first axis;
        a plurality of internal chambers between the first outside surface and the second outside surface, each internal chamber including a first inside surface lying along a second axis perpendicular to the first axis, a second inside surface parallel to the first inside surface, and a filter support extending from the second inside surface along the first axis, and each internal chamber having a chamber height along the first axis and a chamber diameter along the second axis greater than the chamber height;
        a plurality of fluid inlet bores extending from the first outside surface to the respective first inside surfaces;
        a plurality of fluid outlet bores extending from the respective second inside surfaces to the second outside surface; and
        a lateral surface extending between the first outside surface and the second outside surface and defining a thickness of the housing, wherein the first outside surface, the second outside surface, and the lateral surface are adjoined together such that the housing has a unitary construction and the filter assembly is movable as a single unit; and
    a plurality of filter elements disposed in the respective internal chambers in contact with the respective filter supports, each filter element having a filter thickness along the first axis less than the chamber height, wherein:
    each filter element partitions the respective internal chamber into a chamber inlet section between the first inside surface and the filter element and a chamber outlet section between the filter element and second inside surface;
    the housing establishes a plurality of fluid flow channels from the inlet bores, through the chamber inlet sections, through the filter elements, through the chamber outlet sections and to the outlet bores, respectively; and
    each fluid flow channel includes a transverse fluid flow component along the second axis in the chamber inlet section and in the chamber outlet section.

2. The filter assembly of claim 1, wherein each filter support comprises a plurality of support walls spaced from each other in a pattern defining a plurality of passages in the chamber outlet section, the passages running in a transverse plane perpendicular to the first axis.

3. The filter assembly of claim 2 wherein, for each filter support, the plurality of passages comprises a plurality of radial passages oriented radially relative to the first axis and a plurality of non-radial passages, and each radial passage communicates with the fluid outlet bore and with at least some of the non-radial passages.

4. The filter assembly of claim 3, wherein each filter support comprises a plurality of support sections shaped as circular sectors, each support section is spaced from an adjacent support section to define one of the radial passages between the two adjacent support sections, the support sections comprise respective groups of the support walls, and the non-radial passages are defined between respective adjacent pairs of the support walls.

5. The filter assembly of claim 1, wherein the housing has a housing thickness in the axial direction from the first outside surface to the second outside surface, and the housing thickness ranges from 4 mm to 20 mm.

6. The filter assembly of claim 1, wherein the fluid inlet bores are arranged in a two-dimensional array on the first outside surface and the fluid outlet bores are arranged in a two-dimensional array on the second outside surface.

7. A method for filtering fluid, the method comprising:
    loading a filter assembly into a filtering apparatus, the filter assembly comprising a plurality of internal chambers formed in a unitary housing and a plurality of filter elements disposed in the respective internal chambers, wherein:
        the housing comprises a first outside surface, a second outside surface, and a lateral surface extending between the first outside surface and the second outside surface and defining a thickness of the housing, wherein the first outside surface, the second outside surface, and the lateral surface are adjoined together such that the housing has a unitary construction such that and the filter assembly is movable as a single unit; and
    loading the filter assembly places a plurality of fluid inlet bores of the filter assembly in communication with a plurality of respective fluid inlet couplings of the filtering apparatus, and a plurality of fluid outlet bores of the filter assembly in communication with a plurality of respective fluid outlet couplings of the filtering apparatus, such that a plurality of separate fluid flow channels are established through the filter assembly, each fluid flow channel running respectively from the fluid inlet coupling, through the fluid inlet bore, through the internal chamber including through the filter element disposed therein, through the fluid outlet bore, and to the fluid outlet coupling; and
    flowing fluid through two or more of the fluid flow channels, wherein the fluid in each of the two or more fluid flow channels passes through the respective filter element and is filtered thereby.

8. The method of claim 7 wherein, in each of the two or more fluid flow channels, the fluid is flowed through the fluid inlet bore and the fluid outlet bore along a first axis, and the fluid is flowed through the internal chamber along the first axis and along a second axis perpendicular to the first axis.

9. The method of claim 8, wherein the fluid flowing through the internal chamber along the second axis comprises a radial flow component oriented radially relative to the first axis and a non-radial flow component oriented non-radially relative to the first axis.

10. The method of claim 8, wherein the fluid flows through the internal chamber along the second axis via a plurality of passages located in the internal chamber adjacent to the filter element.

11. The method of claim 7, wherein flowing the fluid through the two or more fluid flow channels comprises flowing the fluid from two or more respective vessels of a dissolution test apparatus, through two or more respective fluid inlet lines, and into the respective fluid inlet couplings of the filtering apparatus, wherein the fluid comprises a dissolution medium, analytes dissolved in the dissolution medium, and particulates carried in the dissolution medium, and wherein at least some of the particulates are filtered by the filter elements, and further comprising flowing the filtered fluid from the respective fluid outlet bores, through respective fluid outlet lines, and to a sample destination.

12. The method of claim 7, wherein the filter assembly loaded into the filtering apparatus is a first filter assembly, and further comprising removing the first filter assembly from the filtering apparatus, loading a second filter assembly into the filtering apparatus such that a plurality of separate flow channels are established through the second filter assembly, and flowing fluid through two of more of the fluid flow channels wherein the fluid in each of the two or more fluid flow channels passes through respective filter elements of the second filter assembly.

13. The method of claim 12, wherein loading the first filter assembly comprises moving the first filter assembly into a filter coupling position between the fluid inlet couplings and the fluid outlet couplings of the filtering apparatus, and loading the second filter assembly comprises moving the second filter assembly into the filter coupling position.

14. The method of claim 13, wherein:
loading the first filter assembly comprises moving the first filter assembly along a first axis from a stack of filter assemblies into a filter assembly holder of a drive plate;
moving the first filter assembly into the filter coupling position comprises moving the drive plate in a first direction along a second axis perpendicular to the first axis until the fluid inlet bores and the fluid outlet bores of the first filter assembly are respectively aligned with the fluid inlet couplings and the fluid outlet couplings;
removing the first filter assembly comprises moving the drive plate in the first direction until the first filter assembly is ejected from the filter assembly holder;
loading the second filter assembly comprises moving the drive plate in a second direction along the first axis opposite to the first direction until the filter assembly holder is aligned with the stack, and moving the second filter assembly from the stack into the drive plate opening; and
moving the second filter assembly into the filter coupling position comprises moving the drive plate in the first direction until the fluid inlet bores and the fluid outlet bores of the second filter assembly are respectively aligned with the fluid inlet couplings and the fluid outlet couplings.

15. The method of claim 14, wherein the filter assembly holder is a drive plate opening.

16. The method of claim 7, wherein the filter assembly is plate-shaped and comprises a first outside surface at which the fluid inlet bores open and a parallel second outside surface at which the fluid outlet bores open, and loading the filter assembly comprises moving the filter assembly from a plurality of filter assemblies stacked together such that first outside surfaces and second outside surfaces of the respective stacked filter assemblies are adjacent, and moving the filter assembly into a filter coupling position between the fluid inlet bores and the fluid outlet bores of the filtering apparatus.

17. The method of claim 7, wherein the filtering apparatus comprises a filter coupling region between the fluid inlet couplings and the fluid outlet couplings, and loading the filter assembly comprises moving the filter assembly along a transverse direction into the filter coupling region, moving the fluid inlet couplings into communication with the fluid inlet bores along a first axial direction perpendicular to the transverse direction, and moving the fluid outlet couplings into communication with the fluid outlet bores along a second axial direction opposite to the first axial direction.

18. A filtering apparatus, comprising:
an inlet chute configured for receiving a stack of plate-shaped filter assemblies, each filter assembly comprising a plurality of separate fluid flow channels and a plurality of respective filter elements;
the filter assembly of claim 1;
a filter coupling assembly comprising a plurality of fluid inlet couplings and a plurality of fluid outlet couplings and movable between an uncoupled position and a coupled position, wherein at the uncoupled position the fluid inlet couplings and the fluid outlet couplings are spaced from each other and define a filter coupling region sized to receive the filter assembly, and at the coupled position the fluid inlet couplings and the fluid outlet couplings are configured for fluid-tight communication with respective fluid flow channels of the filter assembly; and
a drive plate movable between a filter loading position, a filter coupling position and a filter ejecting position, wherein at the filter loading position the drive plate is configured for receiving a filter assembly from the inlet chute, at the filter coupling position the drive plate is configured for positioning the fluid flow channels of the filter assembly in the fluid coupling region between the fluid inlet couplings and the fluid outlet couplings, and at the filter ejecting position the drive plate is configured for ejecting the filter assembly from the drive plate.

19. The filtering apparatus of claim 18, wherein the drive plate comprises a filter assembly holder configured for receiving and carrying a filter assembly, and wherein at the filter loading position the filter assembly holder is aligned with the inlet chute, at the filter coupling position the filter assembly holder is in the filter coupling region, and at the filter ejecting position the drive plate is outside of the filter coupling region.

20. The filtering apparatus of claim 19, wherein the filter assembly holder is a drive plate opening.

* * * * *